(12) United States Patent
Kao et al.

(10) Patent No.: US 6,774,943 B1
(45) Date of Patent: Aug. 10, 2004

(54) METHOD AND APPARATUS FOR EDGE ENHANCEMENT IN DIGITAL IMAGES

(75) Inventors: Sophia Wei-Chun Kao, Cupertino, CA (US); Der-Ren Chu, San Jose, CA (US); Ren-Yuh Wang, Cupertino, CA (US)

(73) Assignee: ESS Technology, Inc., Fremont, CA (US)

( * ) Notice: Subject to any disclaimer, the term of this patent is extended or adjusted under 35 U.S.C. 154(b) by 0 days.

(21) Appl. No.: 09/386,256

(22) Filed: Aug. 31, 1999

Related U.S. Application Data

(60) Provisional application No. 60/098,751, filed on Sep. 1, 1998.

(51) Int. Cl.[7] .............................................. H04N 5/208
(52) U.S. Cl. ..................................................... 348/252
(58) Field of Search ................................ 348/252, 251, 348/254, 222.1, 264, 272, 625; 358/3.26, 3.27, 447, 518; 382/275, 274, 162, 167, 300, 266, 205, 260

(56) References Cited

U.S. PATENT DOCUMENTS

| | | | |
|---|---|---|---|
| 4,868,670 A | 9/1989 | Morton et al. | 358/447 |
| 4,962,419 A | 10/1990 | Hibbard et al. | 358/37 |

(List continued on next page.)

FOREIGN PATENT DOCUMENTS

| | | |
|---|---|---|
| EP | 0440563 | 8/1991 |
| EP | 0560170 | 9/1993 |
| EP | 0883086 | 12/1998 |
| EP | 0891075 | 1/1999 |
| JP | 10108209 | 4/1998 |
| WO | 99 04555 | 1/1999 |

*Primary Examiner*—Aung Moe
(74) *Attorney, Agent, or Firm*—Dorsey & Whitney LLP

(57) ABSTRACT

An apparatus for edge enhancement of a digital image provided as raw digital image data to an input terminal and for providing processed image data to an output terminal. An offset processing circuit is coupled to the input terminal and configured to receive the raw data and generate offset data. An interpolation circuit is coupled to the offset processing circuit and configured to receive the offset data and to provide interpolated data. A color processing circuit is coupled to the interpolation circuit and configured to process the interpolated data to generate color data. An edge enhancement circuit is coupled to the interpolation circuit and the color processing circuit and configured to enhance the edges of the image based on the interpolated data and the color data to generate enhanced data. A lookup table is coupled to the color processing circuit and the edge enhancement circuit and configured to lookup the color data and the enhanced data to generate lookup data. A conversion circuit is coupled to the lookup table circuit and configured to convert the lookup data to generate the processed image data to the output terminal. In one aspect of the invention the processing is performed with RGB data, and in another aspect of the invention the processing is performed with YUV data. In another embodiment of the invention the edge enhancement circuit includes an edge extraction circuit, a cut-off level adjustment circuit and an edge gain scaling circuit. These circuits are used to define the edge of objects in the image and to enhance their respective edges. Advantages of the present invention include correctly locating object edges, and avoiding artifacts when the edges are enhanced. Consequently, the invention provides an improved image edge enhancement technique over conventional edge processors.

18 Claims, 11 Drawing Sheets

U.S. PATENT DOCUMENTS

| | | | |
|---|---|---|---|
| 4,965,679 A | | 10/1990 | Morton et al. ............... 358/462 |
| 5,008,739 A | * | 4/1991 | D'Luna et al. ............. 348/254 |
| 5,038,216 A | | 8/1991 | Easterly et al. ............. 358/228 |
| 5,172,227 A | | 12/1992 | Tsai et al. |
| 5,321,511 A | * | 6/1994 | Min ........................... 348/625 |
| 5,523,849 A | * | 6/1996 | Jamzadeh ................... 382/266 |
| 5,596,367 A | * | 1/1997 | Hamilton, Jr. et al. ...... 348/272 |
| 5,652,621 A | | 7/1997 | Adams, Jr. et al. |
| 5,673,355 A | * | 9/1997 | Strolle et al. ................... 386/9 |
| 5,717,789 A | * | 2/1998 | Anderson et al. ........... 382/254 |
| 5,757,977 A | * | 5/1998 | Mancuso et al. ........... 382/260 |
| 5,872,864 A | * | 2/1999 | Imade et al. ................ 382/176 |
| 5,880,767 A | * | 3/1999 | Liu ............................ 382/266 |
| 5,886,797 A | * | 3/1999 | Shimura ..................... 382/266 |
| 6,148,116 A | * | 11/2000 | Park et al. ................... 382/266 |
| 6,285,798 B1 | * | 9/2001 | Lee ............................ 382/260 |

* cited by examiner 5 to 3 down sampling 2 to 1 down sampling 10 to 3 down sampling 4 to 1 down sampling

METHOD AND APPARATUS FOR EDGE ENHANCEMENT IN DIGITAL IMAGES

REFERENCE TO RELATED APPLICATIONS

This application claims priority to Provisional Application No. 60/098,751 filed Sep. 1, 1998, incorporated herein by reference.

FIELD

The present invention relates to a method and apparatus for edge enhancement in digital images. In particular, the invention provides an image processing technique that provides an improved image with enhanced edge sharpness.

BACKGROUND

Digital image capture and processing is an important technology because it provides for the easy sharing of images over a computer network. In order to provide a high quality image, the edges of objects within the image should be sharp. One problem that has persisted in digital capture devices (e.g. cameras) is in the charge coupled devices (CCD) that are used to capture the image. Sometimes the CCDs will not function properly or will give erroneous data. This is sometimes considered a missing pixel. In such cases, conventional capture devices provide erroneous image data to the display device and a distorted image is reproduced. Accordingly, a technique of overcoming the missing pixel problem is desirable.

Further, edge enhancement is a very desirable feature in digital and personal computer (PC) cameras. However, the quality of a reconstructed image from digital cameras is usually lower than that of a regular camera. This is due at least in part to the lower resolution and quality of the CCDs used in the camera. Consequently, edge enhancement increases the sharpness of the output image and provides users a better viewing experience.

There are two keys to a successful edge enhancement technique. One is to correctly locate the edges, and the second is to avoid artifacts when the edges are enhanced. The present invention provides a technique that efficiently performs both of these steps and overcomes the limitations identified in the conventional digital cameras.

SUMMARY

The invention overcomes the identified limitations and provides an improved image edge enhancement technique. An exemplary embodiment of the invention is an apparatus for edge enhancement of a digital image provided as raw digital image data to an input terminal and for providing processed image data to an output terminal. An offset processing circuit is coupled to the input terminal and configured to receive the raw data and generate offset data. An interpolation circuit is coupled to the offset processing circuit and configured to receive the offset data and to provide interpolated data. A color processing circuit is coupled to the interpolation circuit and configured to process the interpolated data to generate color data. An edge enhancement circuit is coupled to the interpolation circuit and the color processing circuit and configured to enhance the edges of the image based on the interpolated data and the color data to generate enhanced data. A lookup table is coupled to the color processing circuit and the edge enhancement circuit and configured to lookup the color data and the enhanced data to generate lookup data. A conversion circuit is coupled to the lookup table circuit and configured to convert the lookup data to generate the processed image data to the output terminal. In one aspect of the invention the processing is performed with RGB data, and in another aspect of the invention the processing is performed with YUV data.

In another embodiment of the invention the edge enhancement circuit includes an edge extraction circuit, a cut-off level adjustment circuit and an edge gain scaling circuit. These circuits are used to define the edge of objects in the image and to enhance their respective edges.

In another embodiment of the invention, the image capture device includes a circuit for implementation of a missing pixel interpolation in a progressive RGB type CCD. The purpose of this implementation is to (a) reconstruct a full resolution RGB color image, (b) offset some of the CCD dark-bright-dark-bright patterns in green pixels due to the neighboring red/blue color filter coatings in alternative lines, (c) absorb down sampling from back-end to front-end (otherwise, additional line memory after interpolation is needed to perform vertical down sampling), and (d) provide each pixel a 3×3-pixel block for later edge enhancement.

Advantages of the present invention include correctly locating object edges, and avoiding artifacts when the edges are enhanced. Consequently, the invention provides an improved image edge enhancement technique over conventional edge processors.

BRIEF DESCRIPTION OF THE FIGURES

Additional advantages of the invention will become apparent upon reading the following detailed description and upon reference to the drawings, in which.

DETAILED DESCRIPTION

Exemplary embodiments are described with reference to specific configurations. Those skilled in the art will appreciate that various changes and modifications can be made while remaining within the scope of the claims. For example, while the invention is described with reference to specific hardware implementations, the invention can be accomplished in software.

Figure 1:
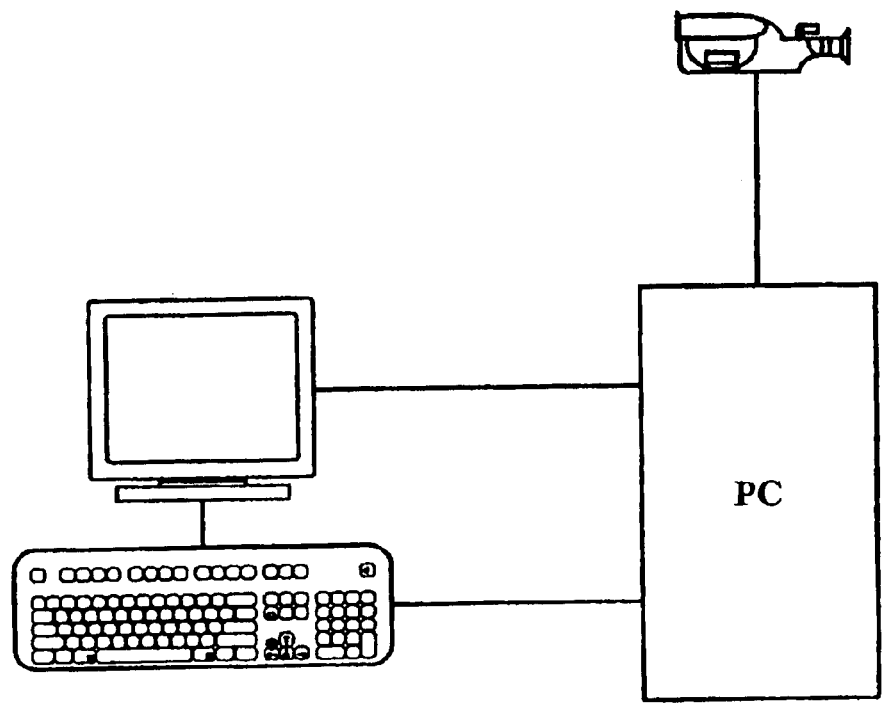
FIG. 1 is a block diagram showing an image capture device and an image processor according to an embodiment of the invention.

FIG. 1 is a block diagram showing an image capture device 10 and an image processor 50. The image capture device is, for example, a camera that includes a lens to focus the image and a number of charge coupled devices (CCD) that detect the light entering through the lens. The CCD generates raw image data. The raw data needs to be processed to reproduce the final high quality image. The CCD generates analog data that is converted via an analog to digital converter (ADC) to 10-bit raw image data.

However, in some cases a missing pixel can cause problems in the representation of the image that can lead to erroneous processing of the image. The invention is directed to an implementation of a missing pixel interpolation in a progressive RGB type CCD. The purpose of this implementation is to (a) reconstruct a full resolution RGB color image, (b) offset some of the CCD dark-bright-dark-bright patterns in green pixels due to the neighboring red/blue color filter coatings in alternative lines, (c) absorb down sampling from back-end to front-end (otherwise, additional line memory after interpolation is needed to perform vertical down sampling), and (d) provide each pixel a 3×3-pixel block for later edge enhancement. Such an implementation supports progressive a type CCD with size up to 640×480-pixel.

Figure 2:
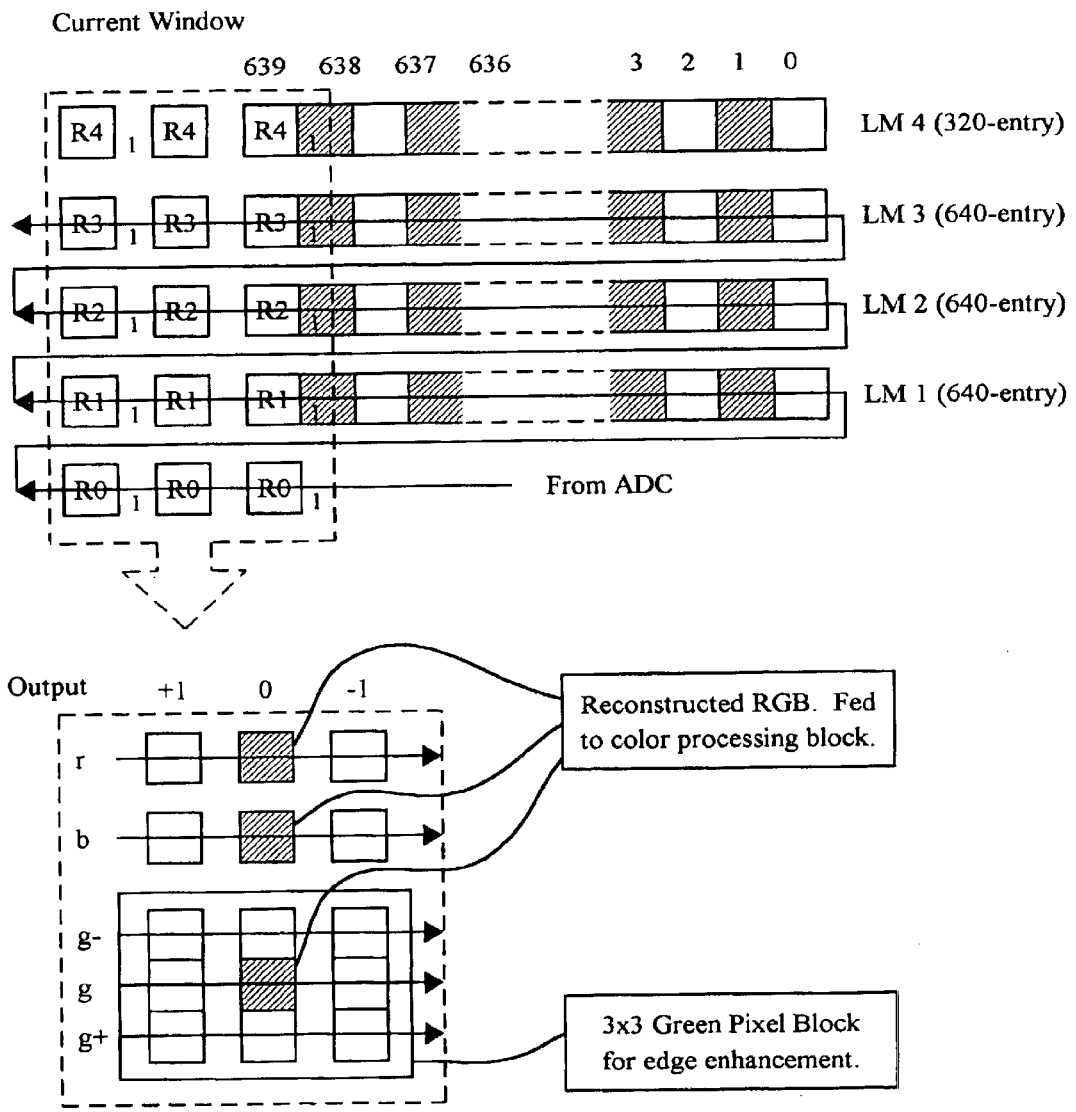
FIG. 2 depicts an architecture for implementing the missing pixel interpolation according to an embodiment of the invention.

FIG. 2 depicts an architecture for implementing the missing pixel interpolation according to an embodiment of the invention. Each square in the diagram is a storage unit with respect to one clock cycle. The arrow indicates the data flow.

The Line Memory (LM) is implemented in single port FIFO to save chip area. Read and write operations are scheduled in different clock phases so that no read/write conflict occurs. Moreover, LM4 is only half the size of LM1 to LM3 because it records only one type of pixel (e.g. green pixels), as explained below.

A pseudo-code algorithm is provided below as an example of a processing technique according to the invention. For red/blue reconstruction the pixel itself is used when it contains the interested color. Otherwise picking out and averaging on the correct color pixels from the neighboring 8 pixels derives the color. This approach smoothers the chromatic discontinuity in both horizontal and vertical directions thus reduces the false color effect due to such a discontinuity.

For green reconstruction the averaging is applied even when the interested pixel has contained green already. Because the red and the blue color filter coatings in red line and in blue line have different effect on neighboring green pixel for some CCDs the green color is unevenly distributed alternatively in red and blue lines. It degrades the image quality and results in undesirable edges which after edge enhancement is further amplified. The averaging technique is employed to eliminate such an impact.

Since only G is used for edge enhancement the 3×3-pixel block is implemented by adding g_ and g+ to represent the green pixels in previous line and in next line. As observed in the algorithm R4 is only used when reconstructing green. Consequently, only green pixels need to be stored in LM4 and this is why LM4 is half the size of other line memory components.

```
/*Pseudo-Code Algorithm*/

/*Reconstruct R*/

If (R2 in a red line){

If (R2 is red) r_{+1} = R2

Else        r_{+1} = (R2_{-1} + R2_{+1})/2;            // R2 is green

}

Else {                                                          // R2 in a blue line If (R2 is blue) r_{+1} = (R1_{-1} + R1_{+1} + R3_{-1} + R3_{+1})/4;

Else        r_{+1} = (R1 + R2_{-1} + R2_{+1} + R3)/4;   // R2 is green

}

/*Reconstruct B*/

If (R2 in a blue line) {

If (R2 is blue) b_{+1} = R2

Else        b_{+1} = (R2_{-1} + R2_{+1})/2;            // R2 is green

}

Else {                                                          // R2 in a red line If (R2 is red) b_{+1} = (R1_{-1} + R1_{+1} + R3_{-1} + R3_{+1})/4;

Else        b_{+1} = (R1 + R2_{-1} + R2_{+1} + R3)/4;   // R2 is green

}

/*Reconstruct G*/

If (R2 is green) { g_{-+1}  = (R2 + R3_{+1} + R3_{-1} + R4)/4;            // R3 is not green
```

-continued $g_{+1} = (R1_{-1} + R1_{+1} + 4*R2 + R3_{-1} + R3_{+1})/8;$ $g+_{+1} = (R0 + R1_{+1} + R1_{-1} + R2)/4;$  // R1 is not green

}

Else {  // R2 is not green $g_{-+1} = (R2_{-1} + R2_{+1} + 4*R3 + R4_{-1} + R4_{+1})/8;$  // R3 is green $g_{+1} = (R2 + R3_{+1} + R3_{-1} + R4)/4;$ $g+_{+1} = (R0_{-1} + R0_{+1} + 4*R1 + R2_{-1} + R2_{+1})/8;$  // R1 is green

}

/*End*/

Another important topic is down-sampling. This implementation supports 5 different image sizes: 640×480, 352×288, 320×240, 176×144 and 160×120. Size 640×480 is almost the full size of CCD (with a small boundary cropped off from CCD's 659×694 pixel output). No down sampling is required. However, different down sampling ratios may be useful to obtain the other sizes.

Figure 3A:
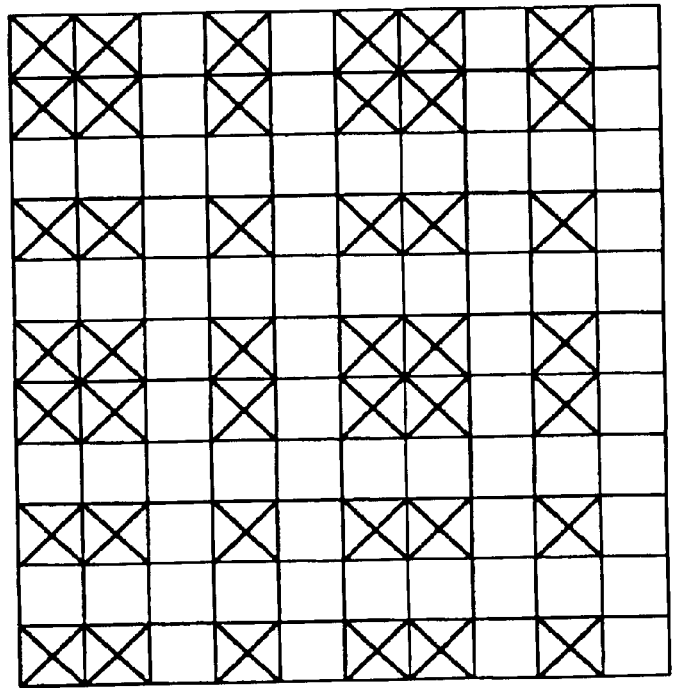
FIGS. 3A–D show various down-sampling techniques according to an embodiment of the invention.
Figure 3B:
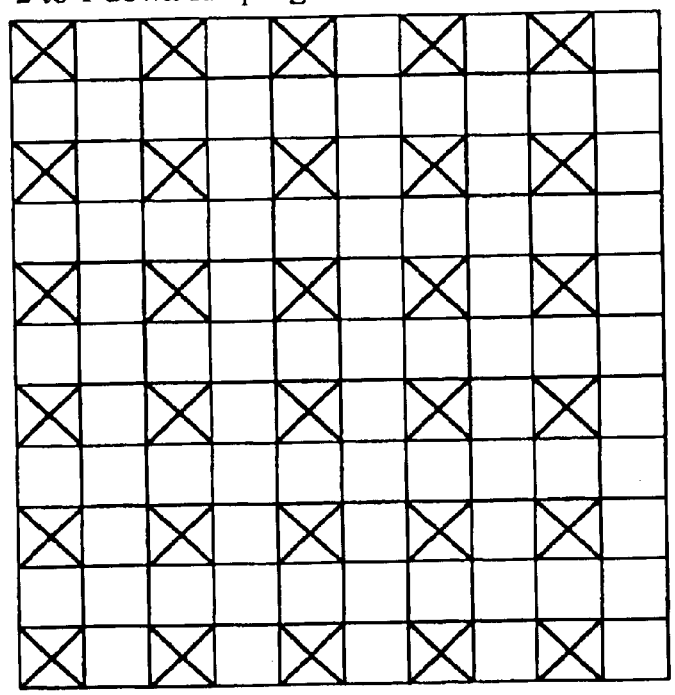
Figure 3C:
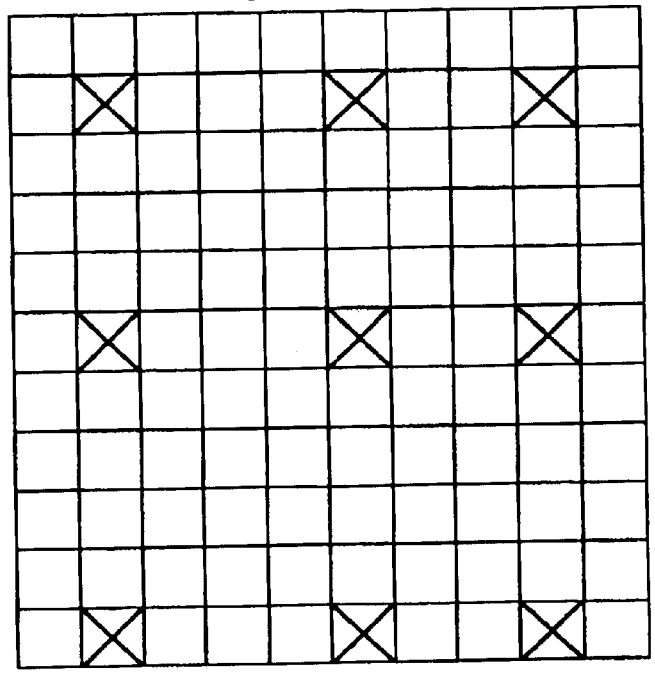
Figure 3D:
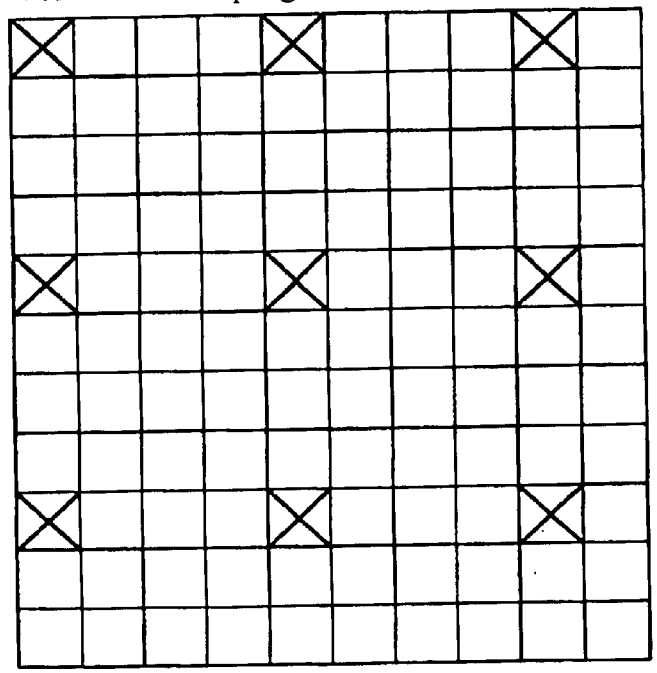

FIG. 3A shows 352×288–5 to 3 down sampling in both X and Y directions and cropping in X (384 to 352). FIG. 3B shows 320×240–2 to I down sampling in both X and Y directions. FIG. 3C shows 176×144–10 to 3 down sampling in both X and Y directions and cropping in X (192 to 176). FIG. 3D shows 160×120–4 to 2 down sampling in both X and Y directions.

Instead of storing reconstructed RGB separately in memory to perform vertical down sampling in the image processing output end, this implementation performs down sampling in the very beginning by adding only control signals to save total memory cost.

Figure 4:
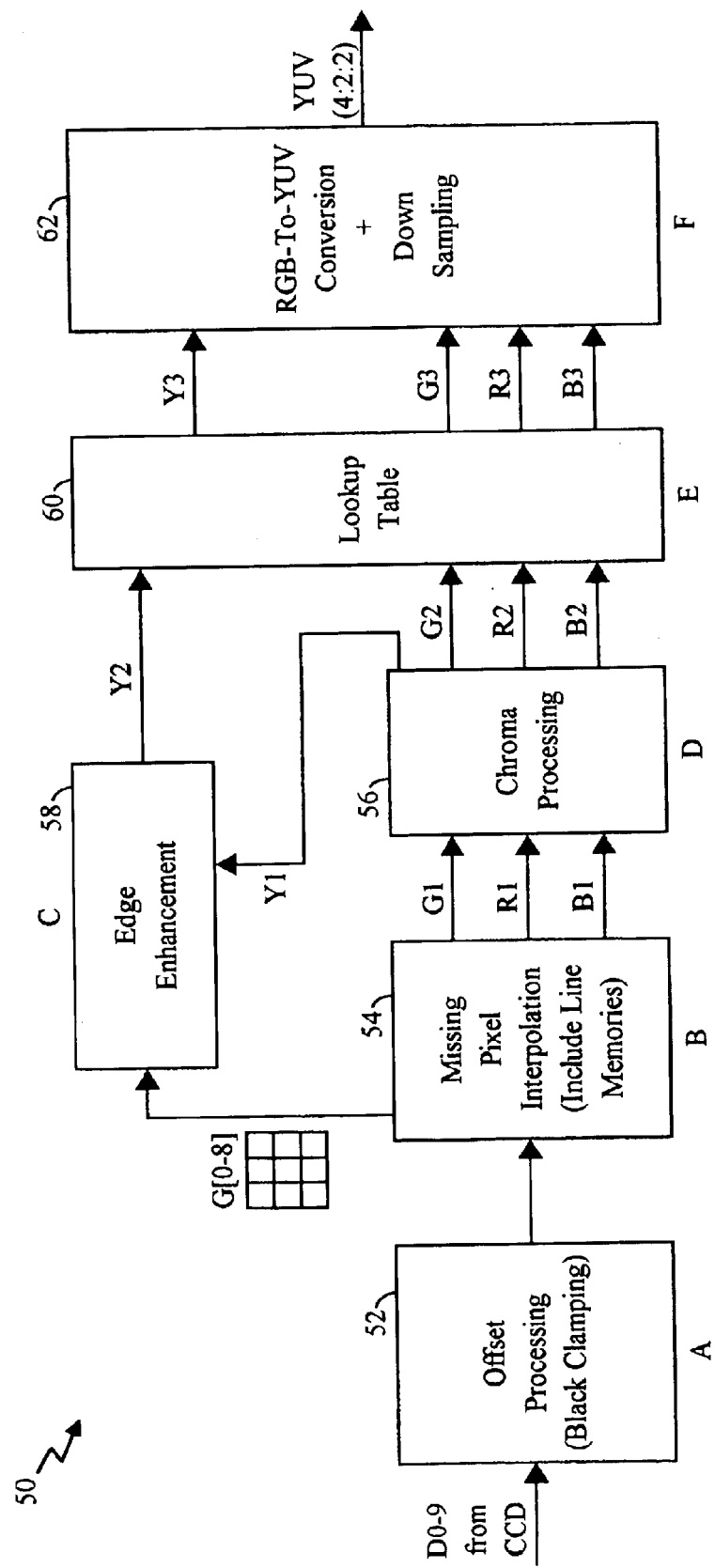
FIG. 4 is a block diagram showing the image processor for edge enhancement according to an embodiment of the invention.

FIG. 4 is a block diagram showing the image processor 50 for edge enhancement according to an embodiment of the invention. An image capture device (e.g. camera) is made up of charge coupled devices (CCD) that detect the light entering into the lens. The CCD generates raw image data. The raw data needs to be processed to reproduce the final high quality image. The CCD generates analog data that is converted via an analog to digital converter (ADC) to 10-bit raw image data. The image processor receives the 10-bit raw image data from the output of the ADC and performs various image-processing tasks. The output of image processor complies with the standard 4:2:2 YCrCb format. The image processor is fully programmable and comprises six major functional components. An offset processing circuit 52 is coupled to the input terminal and configured to receive the 10-bit raw data and generate offset data. An interpolation circuit 54 is coupled to the offset processing circuit and configured to receive the offset data and to provide interpolated data. A color processing circuit 56 is coupled to the interpolation circuit and configured to process the interpolated data to generate color data. An edge enhancement circuit 58 is coupled to the interpolation circuit and the color processing circuit and configured to enhance the edges of the image based on the interpolated data and the color data to generate enhanced data. A lookup table 60 is coupled to the color processing circuit and the edge enhancement circuit and configured to lookup the color data and the enhanced data to generate lookup data. A conversion circuit 62 is coupled to the lookup table circuit and configured to convert the lookup data to generate the processed image data to the output terminal. In one aspect of the invention the processing is performed with RGB data, and in another aspect of the invention the processing is performed with YUV data.

Figures 5, 6:
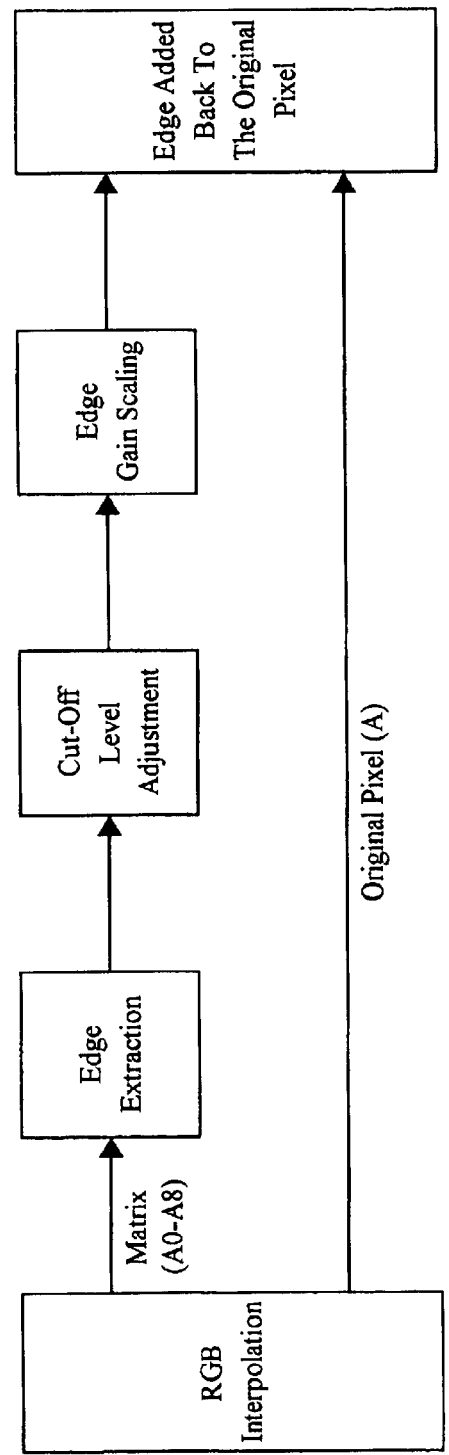
FIG. 5 depicts a raw CCD data pattern.
FIG. 6 depicts steps for enhancing edges in the image according to an embodiment of the invention.

When data is first fed into the image processor 50 from the CCD sensor, there is only one color component for each input pixel. The R, G and B components are interleaved as shown in FIG. 5. The input raw data is first processed by the black offset clamping circuit 52. The missing color components are then derived from the values of the closest neighboring pixel with the missing colors in the color interpolation circuit 54. After color reconstruction, each pixel possesses its owns R, G and B values. Pixels are then sent to color processing circuit 56 for gain adjustment in its respective red, blue or green value for white balancing, CCD spectrum compensation, and other processing.

Edge enhancement can be performed in the RGB domain or in YUV domain. In this system the edge processing is performed after the raw data is reconstructed to RGB domain as shown in the image processor edge enhancement circuit 58. There are line buffers in the interpolation circuit 54 to hold up to 3 lines of pixels for edge enhancement. A 3×3 matrix of green pixels and the luminance value of the central pixel are obtained and passed to the enhancement circuit 58 for edge enhancement. After that, R, G, B and luminance values for each pixel are sent to a look-up table 60 and then to the RGB to YUV color space conversion circuit 62 where conversion is performed.

The edge enhancement procedure includes several steps as shown in FIG. 6. The first step is to identify the changes on luminance of pixels located on the boundaries of an object in the target image. Changes in luminance values cause edges to appear. This step is called edge detection. The second step is to decide a valid range of the edge values where further edge gain will be applied. In this Specification, the term effective edge values is used to define these edges where the gain will be applied. The effective edge values are multiplied by a gain factor assigned by users and the result is an edge gain value. Finally, the edge gain value is added to the original luminance to produce the final edge-enhanced pixel.

Figure 7:
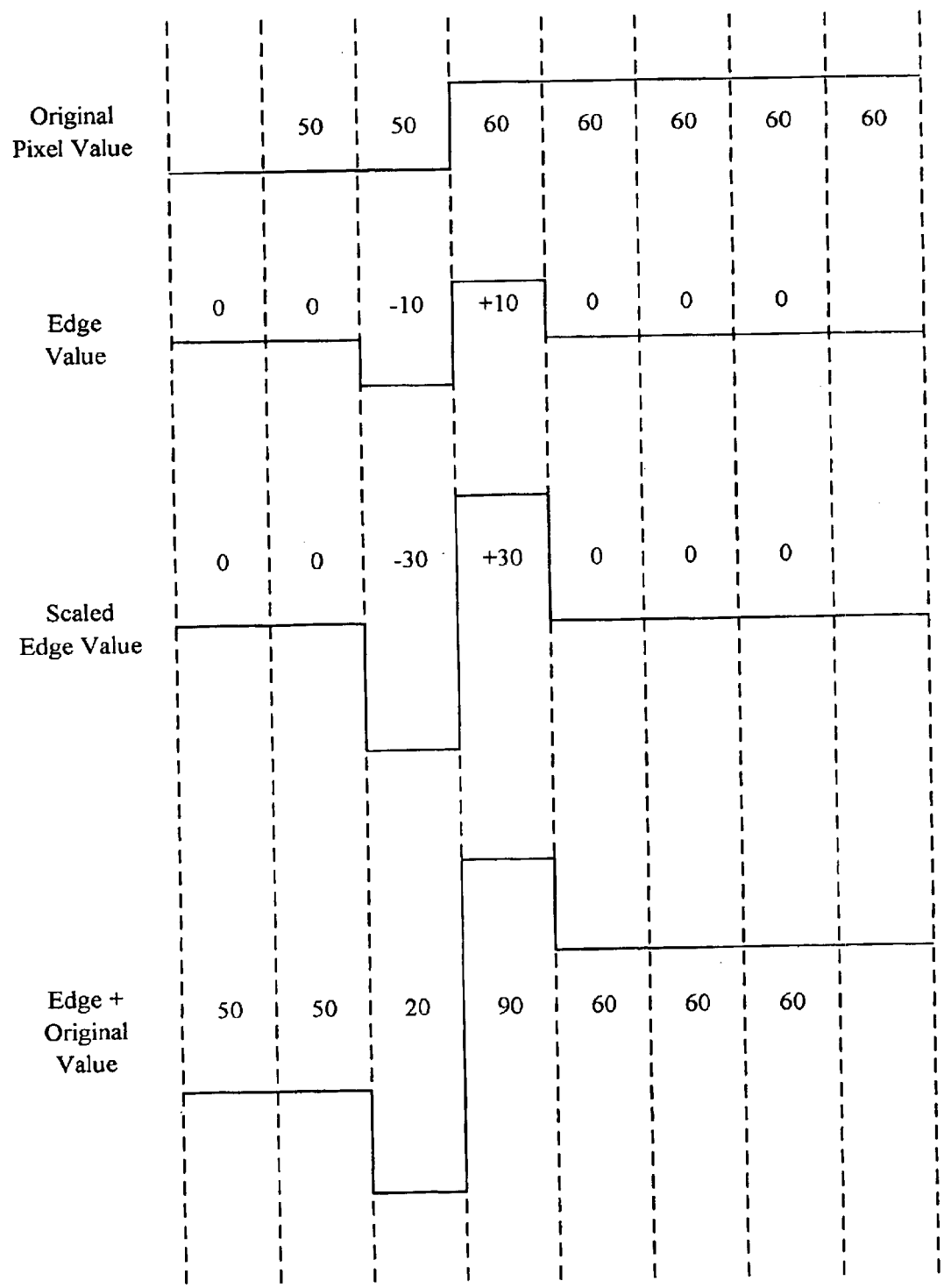
FIG. 7 depicts an edge detection and enhancement procedure.

FIG. 7 illustrates the calculation steps during the edge enhancement procedure. The original image is simplified to a one-dimension line. The low to high transition in that line is first detected (i.e. edge extraction) using the matrix operation for the horizontal direction edge extraction as described below. Then, the edge is scaled up by a user-specified gain factor. Lastly, the final edge-enhanced value is computed by adding the scaled edge to the original pixel.

Figures 8, 9:
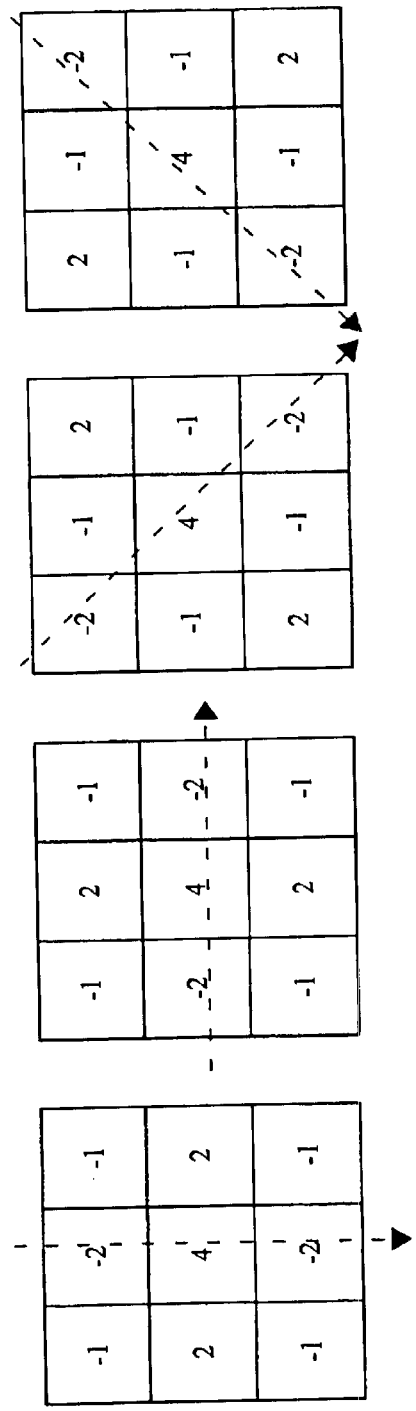
FIG. 8 depicts a 3×3 block for edge detection.
FIG. 9 depicts weighting factors for the 3×3 matrix used to detect an edge boundary in four different directions.

A first key to achieve the best result for the edge enhancement algorithm is to correctly identify the edges in a picture. Edge extraction on any pixel A in the image is carried out by performing special filtering on the 3×3 pixel block centered at A as shown in FIG. 8. Value changes of the neighboring pixels of A in horizontal, vertical or diagonal directions can be detected by using the weighting factors as shown in FIG. 9. FIG. 9 illustrates the weighting factors for the 3×3 matrix used to detect edge boundary in 4 different directions. From left to right: vertical, horizontal, top-left to bottom-right and top-right to bottom-left diagonal directions. The maximum absolute value of results from the 4 matrix operations is the edge value for pixel A. Edges obtained from these matrix operations are vectors. As show in FIG. 7, a low-to-high transition in the original image creates a negative edge and a positive edge of equal value.

Each pixel has a luminance value and a chrominance value. Edge extraction operations explained in previous section are best done using the luminance value. However, to perform edge processing based on true luminance data requires the complete R, G, B values to be available for all 9 pixels in the 3×3 matrix. This requires extra line buffers in the color interpolation circuit 14. Due to hardware limitations, the invention uses the green value instead of luminance for the 3×3 matrix in edge detection.

However, when the final edge-enhanced value is ready to be added back to the original pixel, the invention uses the luminance value for the original pixel. Compared to the use of green pixel for the original pixel for edge processing, enhanced luminance shows much better results than enhanced green does in the final output.

There is a small variation caused by analog noise on the readings of data from CCD sensor. As a result, the reconstructed pixels inherit the noises and sometimes show undesirable dotted patterns in the image. Such noises, if located by edge detection circuitry, should not be enhanced. Accordingly, a cutoff threshold is applied to edges below certain level to prevent possible enhancement of such noises.

On the contrary, when there are large abrupt changes of luminance values in the neighboring pixels on the scene (for example, the black and white boundaries around the hair line of a person standing in front of a lighted wall), an attempt to enhance such edges usually creates annoying artifacts in the final image. In this case, edges exceeding certain high threshold should also be kept from enhancement.

Figure 10:
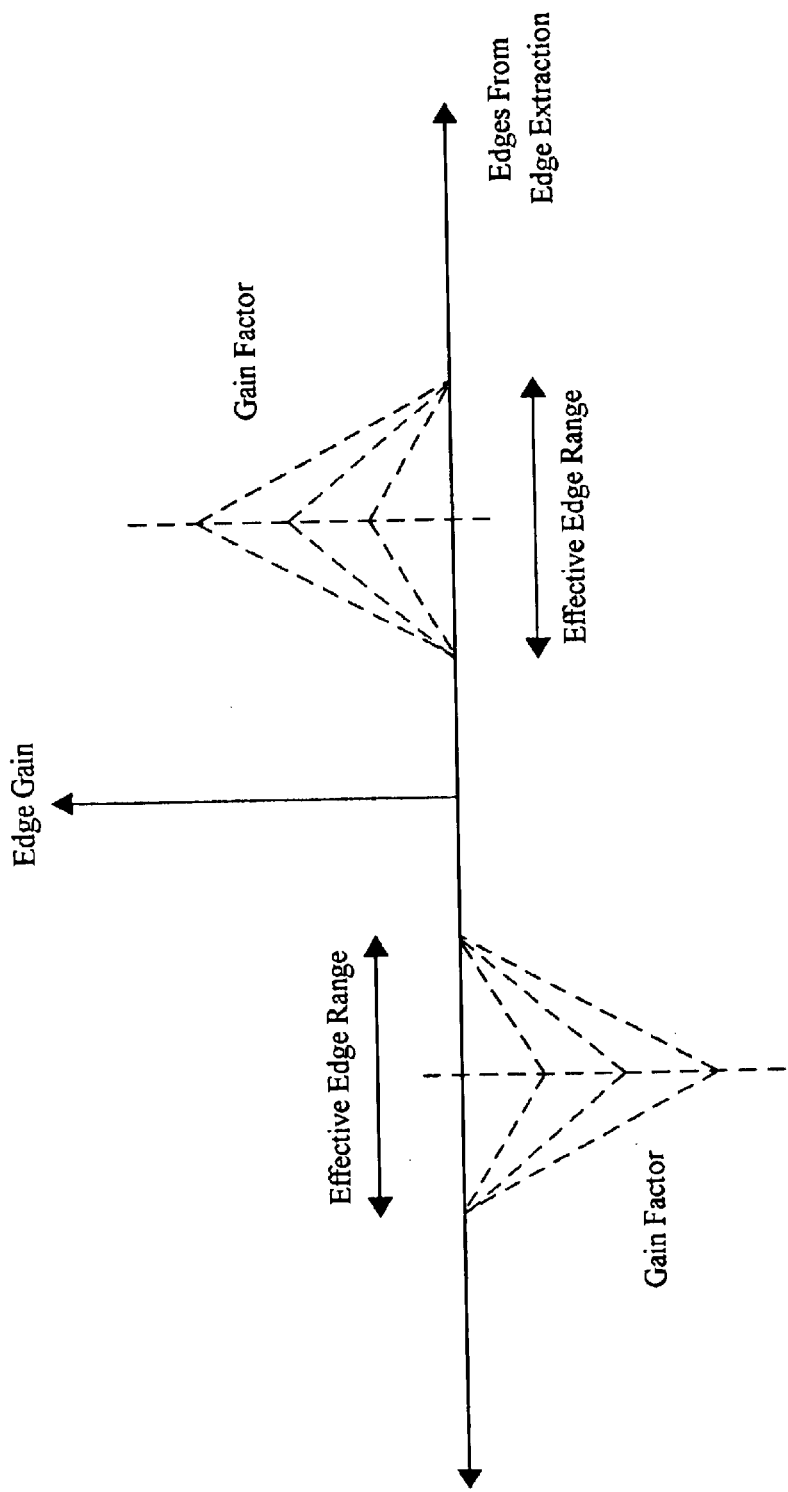
FIG. 10 depicts cut-off level and gain control according to an aspect of the invention.

To serve the identified purposes, the edges extracted from the previous steps are sent to a range checking circuit. A high cutoff value and a low cutoff value are given as shown in FIG. 10. Edges are dropped where the absolute value is smaller than the cutoff low value or greater than cutoff high value. The remaining effective edges are multiplied by a programmable gain factor. More discussion and adjustments about the gain factor are described in the following paragraphs.

After the cutoff range check, a user specified gain factor is applied to each effective edge. Adjustments on this gain value before the multiplication helps to avoid artifacts and improve the final image quality. Details about the adjustments are described below.

Figure 11:
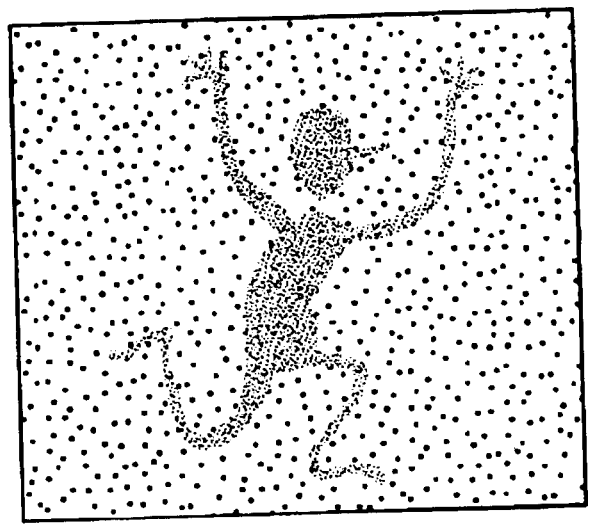
FIG. 11 depicts an image with a brightness in the background of 60 and a brightness in the foreground of 50.
Figure 12:
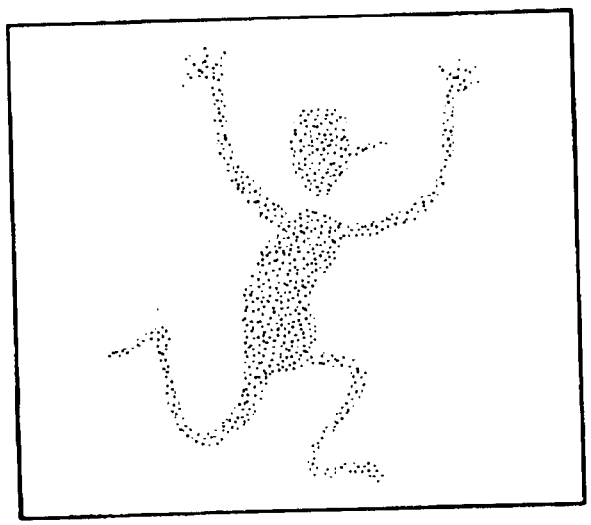
FIG. 12 depicts an image with a brightness in the background of 110 and a brightness in the foreground of 100.

First, consider the gain adjustment based on the brightness level in the neighboring pixels. Considering a darker scene as shown in FIG. 11 and a brighter scene in FIG. 12, the same amount of change in luminance level appears to have drastically different viewing result. The object in FIG. 11 catches more attention than the object in front of a lighter background in FIG. 12.

The reason behind such discrepancy is the non-linear nature of human vision. The human eye is more sensitive in a darker environment than under a bright light. In other words, the same amount of changes in luminance level will appear to be more dramatic when seen from a gray area than from a light background.

This observation helps the invention to improve the edge enhancement algorithm. It implies that a user-specified edge gain factor should be increased if the brightness of the neighboring pixels is higher and decreased if the neighboring background is darker. Based on this observation, an improved edge gain factor G' is derived from the original edge gain factor G using the following equations to adjust the edge value according to the neighboring pixel:

(1) $G'=G*B$, where G is the user specified gain factor, G' is gain factor after adjustment, B is the coefficient to adjust to the brightness in the neighboring pixel, and (2) $B=\log A$, wherein A is the average luminance value of neighboring pixels in a 3×3 block.

Finally, there is a desire to compensate for an unbalanced edge gain ratio. The last step of edge enhancement is to add the edge gain value to the original luminance value as illustrated at the bottom of FIG. 7. As mentioned above, the edge is a vector. There is a positive and a negative edge associated with each value transition. Based on the observation from the previous section regarding the non-linear nature of human vision system, there is now described why and how different gain ratios applied to positive edges and negative edges could reduce the artifacts.

Figure 13:
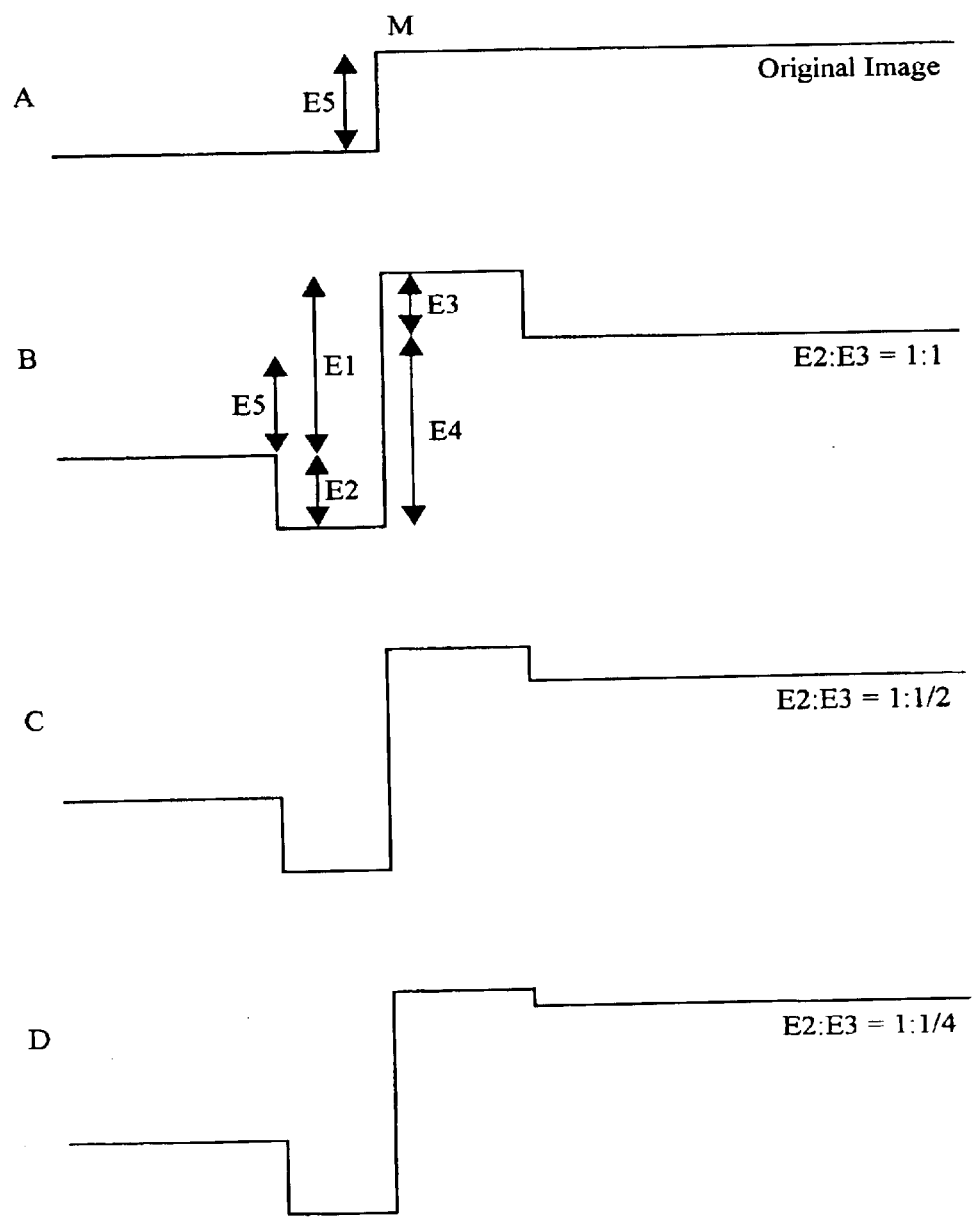
FIG. 13 depicts examples of an unbalanced edge gain ratio.

Referring to FIG. 13, the original image (part A) shows a transition E5 at point M from a darker scene (small luminance value) to a brighter scene (large luminance value). After the edge is extracted and scaled accordingly, the edge gain is added to the original image as show in part B. The edge enhancement operation results in a negative value change E2 and a positive value change E3. Note that E2 is equal to E3, when calculated from the matrix operations. The amount of change in luminance value at point M increases by E2+E3 and thus the edge enhancement is achieved.

In part B, E1 and E2 are the value changes viewed from the darker side of the original image and E3 and E4 are the value changes viewed from the brighter side of the original image. As described above, the human eye is more sensitive to changes in a darker background than those in a brighter background. Attention has to be paid to E1 and E2 because of this. Note the observance that E1 usually causes artifacts especially when there are big changes in luminance level (i.e. E5) in the original image. To minimize such artifacts, a ratio adjustment of 1/N is applied to E3 which represents the positive edge gain, while the value of the negative edge gain E2 is kept unchanged. The ratio-adjusted results of N=2 and N=4 are presented in parts C and part D in FIG. 13. Compared to part B, E2 is the same but E1 is now smaller to reduce the artifacts.

As described above, an effective edge enhancement system is explained which includes the following 5 steps: edge extraction, luminance source selection, effective edge range check, neighboring pixel brightness adjustment and edge gain ratio adjustment. There are two keys to the inventive edge enhancement mechanism. One is to correctly locate the edges, and the second is to avoid artifacts when the edges are enhanced. The first step addresses the edge extraction issue and step 3 through step 5 focus on artifact reduction.

Advantages of the present invention include correctly locating object edges, and avoiding artifacts when the edges are enhanced. Consequently, the invention provides an improved image edge enhancement technique over conventional edge processors.

Having disclosed exemplary embodiments and the best mode, modifications and variations may be made to the disclosed embodiments while remaining within the scope of the invention as defined by the following claims.

What is claimed is:

1. Apparatus for enhancing the edges of an object in a digital image, comprising:

means for assigning an edge value to each pixel in the image in accordance with a difference in luminance between that pixel and neighboring pixels;

means for filtering the edge values to identify pixels which are located at the edges of the object;

means for scaling the edge value for each pixel so identified with a gain factor which is adjusted in accordance with the luminance of the neighboring pixels;

means for combining the scaled edge value with the original luminance value of the pixel to provide an enhanced value; and means for adjusting the gain factor in -accordance with the relationship G'=G*log A, where G is a specified gain factor and A is the average luminance value of the neighboring pixels.

2. The apparatus of claim 1 wherein the means for filtering the edge values includes means for comparing the edge values with upper and lower cutoff values and discarding edge values which are below the lower cutoff value or above the upper cutoff value.

3. The apparatus of claim 1 wherein the gain factor is user-specified.

4. The apparatus of claim 1 wherein the means for combining the scaled edge value with the original luminance value includes means for adding the scaled edge value to the original luminance value.

5. The apparatus of claim 1 wherein the scaled edge value includes both a positive component and a negative component, and the apparatus includes means for reducing the positive component in magnitude relative to the negative component in order to minimize artifacts associated with large transitions in luminance in the original image.

6. The apparatus of claim 1 further including means for reconstructing the image to provide missing pixels prior to assigning the edge values are assigned to the pixels.

7. The apparatus of claim 6 further including means for comparing the luminance values of nearby pixels to determine an appropriate luminance value for a missing pixel, and assigning the luminance value thus determined to the missing pixel.

8. The apparatus of claim 1 further including means for offsetting dark-bright-dark-bright patterns in green pixels due to neighboring red/blue color filter coatings in alternate lines.

9. The apparatus of claim 1 wherein the means for assigning an edge value includes means for comparing only the green components of the pixel and the neighboring pixels to determine the difference in luminance, and the means for combining the scaled edge value with the luminance value includes means for combining the scaled edge value with the full luminance value of the pixel to provide the enhanced value.

10. A method of enhancing the edges of an object in a digital image, comprising the steps of:

assigning an edge value to each pixel in the image in accordance with a difference in luminance between that pixel and neighboring pixels;

filtering the edge values to identify pixels which are located at the edges of the object;

scaling the edge value for each pixel so identified with a gain factor which is adjusted in accordance with the luminance of the neighboring pixels; and combining the scaled edge value with the original luminance value of the pixel to provide an enhanced value;

the gain factor is adjusted in accordance with the relationship G'=G*log A, where G is a specified gain factor and A is the average luminance value of the neighboring pixels.

11. The method of claim 10 wherein the edge values are filtered by comparing the edge values with upper and lower cutoff values and discarding edge values which are below the lower cutoff value or above the upper cutoff value.

12. The method of claim 10 wherein the gain factor is user-specified.

13. The method of claim 10 wherein the scaled edge value is combined with the original luminance value by addition.

14. The method of claim 10 wherein the scaled edge value includes both a positive component and a negative component, and the positive component is reduced in magnitude relative to the negative component in order to minimize artifacts associated with large transitions in luminance in the original image.

15. The method of claim 10 further including the step of reconstructing the image to provide missing pixels prior to assigning the edge values are assigned to the pixels.

16. The method of claim 15 further including the steps of comparing the luminance values of nearby pixels to determine an appropriate luminance value for a missing pixel, and assigning the luminance value thus determined to the missing pixel.

17. The method of claim 10 further including the step of offsetting dark-bright-dark-bright patterns in green pixels due to neighboring red/blue color filter coatings in alternate lines.

18. The method of claim 10 wherein only the green components of the pixel and the neighboring pixels are compared in determining the difference in luminance, and the scaled edge value is combined with the luminance value of the pixel to provide the enhanced value.

* * * * *